United States Patent [19]

Nagase

[11] Patent Number: 4,866,552
[45] Date of Patent: Sep. 12, 1989

[54] MAGNETIC TAPE DRIVE WITH IMPROVED CARTRIDGE INSERTION AND WITHDRAWAL MECHANISM

[75] Inventor: Yasuo Nagase, Machida, Japan

[73] Assignee: Arnitsu Corporation, Tokyo, Japan

[21] Appl. No.: 97,768

[22] Filed: Sep. 17, 1987

[30] Foreign Application Priority Data

Oct. 27, 1986 [JP] Japan ................................ 61-253739
Oct. 27, 1986 [JP] Japan ................................ 61-253740
Oct. 27, 1986 [JP] Japan ................................ 61-253741

[51] Int. Cl.⁴ ........................ G11B 21/02; G11B 15/54
[52] U.S. Cl. .................................... 360/96.5; 360/71; 360/93; 360/961; 360/105
[58] Field of Search ................ 360/71, 93, 96.1, 96.5, 360/105; 242/197–199

[56] References Cited

U.S. PATENT DOCUMENTS

| | | | |
|---|---|---|---|
| 3,882,542 | 5/1975 | Nakamichi | 360/96.5 X |
| 4,188,647 | 2/1980 | Tanaka | 360/105 |
| 4,337,487 | 6/1982 | Takai | 360/71 |
| 4,559,571 | 12/1985 | Olmsted et al. | 360/105 |
| 4,573,091 | 2/1986 | Barton, Jr. et al. | 360/93 |
| 4,586,095 | 4/1986 | Olmsted | 360/93 |
| 4,608,615 | 8/1986 | Zeavin | 360/96.5 |
| 4,622,606 | 11/1986 | Rudi | 360/96.5 |
| 4,636,890 | 1/1987 | Rudi et al. | 360/96.5 |
| 4,673,995 | 6/1987 | Spiegelstein | 360/93 |
| 4,677,508 | 6/1987 | Barton, Jr. et al. | 360/96.5 |

Primary Examiner—John H. Wolff
Attorney, Agent, or Firm—Sughrue, Mion, Zinn, Macpeak & Seas

[57] ABSTRACT

A magnetic tape drive for insertion of a magnetic tape cartridge of the type having an access door pivotally mounted on a long side of the cartridge is disclosed. The cartridge is inserted through a slot in a front panel of a drawer with the long side of the cartridge parallel to the insertion direction. When the cartridge is inserted, the drawer is in an extended position and is held there by a drawer stopping mechanism. The cartridge is inserted through the slot onto the drawer as far as is permitted by a cartridge stopping mechanism. A rotatably mounted front door on the front panel of the drawer is then rotated closed and the access door of the cartridge is opened by a cam mounted on the front door in response to the rotation thereof. Cartridge and drawer release mechanisms then allow the cartridge and drawer to be fully inserted into a frame of the drive, and as the drawer and cartridge approach their operative positions in the drive, a magnetic head is moved into its operative position with respect to the cartridge in response to movement of the drawer. In addition, means for simultaneously detecting completion of insertion of the cartridge and drawer are provided.

36 Claims, 9 Drawing Sheets

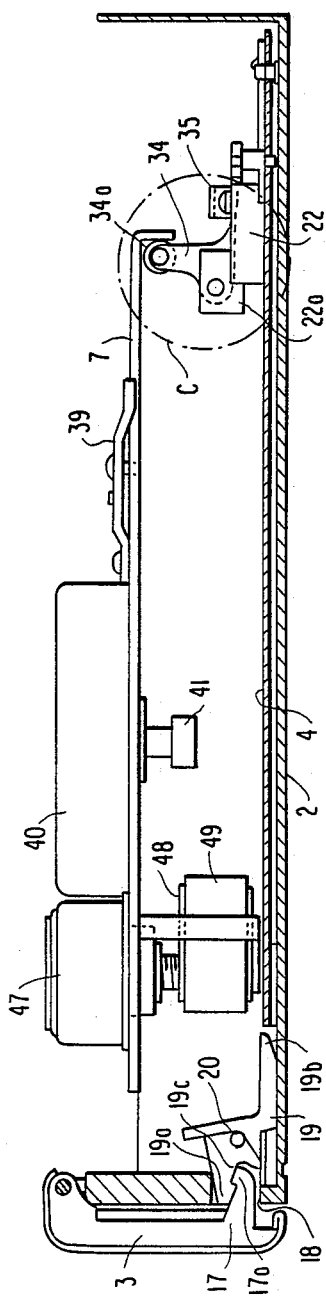
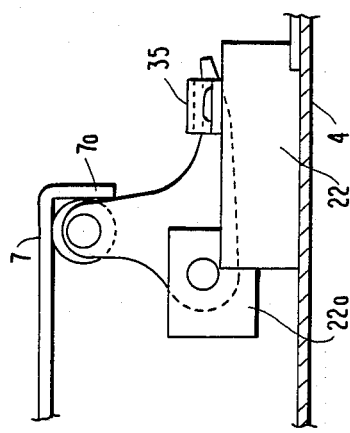

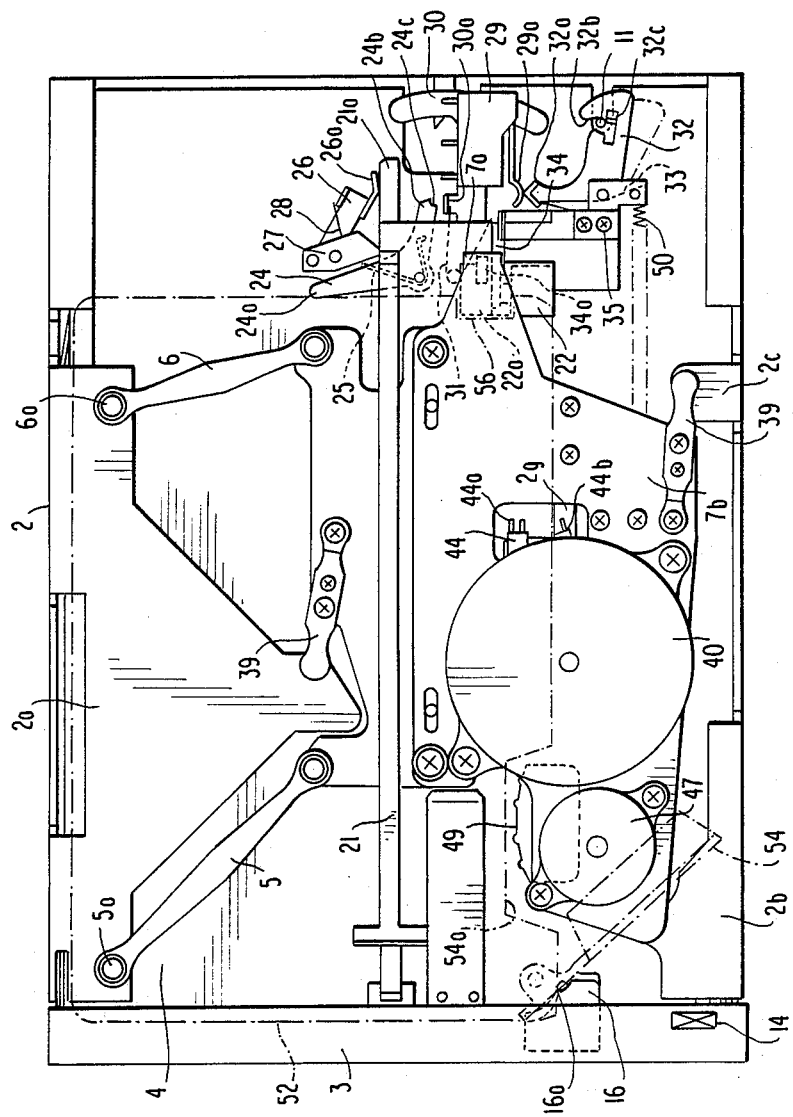

MAGNETIC TAPE DRIVE WITH IMPROVED CARTRIDGE INSERTION AND WITHDRAWAL MECHANISM

BACKGROUND OF THE INVENTION

The present invention relates to magnetic tape drives, and in particular, to a mechanism of a magnetic tape drive for opening an access door of a tape cartridge such that the cartridge can be inserted into the drive in a direction parallel to the long dimension of the cartridge and drive, and such that the cartridge will be operatively positioned in the drive upon insertion therein. The present invention also relates to a mechanism for detecting full insertion of the tape cartridge.

One of the problems which has been encountered in the art is that of inserting a magnetic tape cartridge with its long dimension parallel to the insertion direction (hereinafter referred to as "longitudinal insertion") into a tape drive. This problem is particularly acute in the case of inserting a cartridge such as that manufactured by Minnesota Mining & Manufacturing Co. (hereinafter, a "3M-type cartridge") into a 5-1/4" form factor tape drive. The 3M-type cartridge has a length of 6", a width of 4" and a pivotably mounted access door along one of the 6" sides. When the axis door is opened, the total width of the cartridge is roughly 5-3/4". Such a cartridge 52 is shown in FIG. 11.

In most tape drives, the cartrige 52 is inserted in the direction of the arrow A, thus requiring an insertion slot width which is equal to the length $l_1$, of the cartridge. To make the drive smaller, it has been proposed to insert the cartridge 52 in the direction of the arrow B. It is further desireable to insert the cartridge into a 5-1/4" form factor tape drive, which is a rectangular prism of no larger than 3-1/4" by 5-3/4" by 8". Since the width of the 3M-type cartridge with the access door open is substantially the same as the maximum width of the 5-1/4" form factor tape drive, it is difficult to provide a simple, inexpensive mechanism for opening the access door of the cartridge and at the same time, achieving longitudinal insertion. Moreover, in a drive in which the cartridge is longitudinally inserted, the magnetic head is generally moved into engagement with the magnetic tape, which is exposed when the access door is opened, by a single-axis link, for example, after the cartridge has been inserted into the frame. Therefore, more than one operation is necessary to insert the cartridge and move the head into engagement with the tape.

One drive which achieves longitudinal insertion is disclosed in U.S. Pat. No. 4,573,091. The drive has an open front end through which a longitudinally extending tray moves. With the tray extended, a cartridge is placed thereon and the tray is retracted. The access door is opened by a spring-biased pin mounted on the tray and linked to a longitudinal side of the drive such that the pin opens the access door during retraction of the tray. Only after the tray and cartridge have been completely retracted into the drive can a load lever on the front of the drive be rotated to move a magnetic head into contact with the surface of the tape exposed by the access door. Moreover, the drive has an open front end which increases the chances that foreign objects will enter the drive and deposit on the head or tape. Further problems with drives of this type are that reliability of proper insertion is not as high as desirable, and that the design is complex requiring an increased number of parts. For example, in order to detect when the tray has been moved into the housing and when the cartridge is in the operative position in the housing, two microswitches are necessary to perform these respective operations. The number of required parts is increased. Moreover, even if the microswitches are intended to simultaneously detect proper positioning of the frame and cartridge, it is difficult to actually actuate the two switches at the same time due to limitations on the accuracy of the switches.

Another drive in which longitudinal insertion is achieved is disclosed in U.S. Pat. No. 4,622,606. A cassette is inserted longitudinally into a tunnel-like insertion channel in a housing. A channel cover is then rotated closed, and in response thereto, a complex link and swivel arm mechanism opens the access door of the cassette. A leaf spring provided at the rear of the housing to prevent full insertion of the cassette prior to opening of the access door. However, if too much force is used to insert the cassette, the leaf spring will yield. Thus, full insertion of the cassette can occur prior to opening of the access door and there is a chance that the magnetic head will collide with the access door. Moreover, as the channel cover is provided on the housing, the cartridge must be most of the way into the drive when the access door is opened. Therefore, the magnetic head must be provided relatively far from its operative position to avoid being struck by the access door during opening thereof.

SUMMARY OF THE INVENTION

It is an object of the invention to provide a tape drive that solves the above-mentioned problems.

It is also an object of the invention to provide a tape drive for longitudinal insertion of a magnetic tape cartridge, e.g. a 3M-type cartridge, which has a simple, inexpensive and reliable mechanism for opening the access door of the cartridge.

An additional object of the invention is to provide a tape drive with a simple, inexpensive, and reliable mechanism for moving a magnetic head into an operative position without having to perform an operation after the cartridge has been fully inserted.

It is a further object of the invention to provide a simple, inexpensive and reliable mechanism for detecting full insertion of the tape and a drawer upon which the tape is supported.

It is a still further object of the invention to provide a drive which protects the tape and magnetic head from dust and the like.

Another object of the present invention is to provide a magnetic tape drive which is composed of a minimum number of parts and has a smaller insertion slot area to achieve a smaller overall drive.

The above-mentioned objects of the invention are achieved by the magnetic tape drive of the present invention, in which the following components are provided:

a frame;

a drawer having an insertion slot in its front panel, for placing thereon a magnetic tape cartridge, the drawer being movable on said frame;

means for opening and closing an access door of the cartridge;

cartridge stopping means and drawer stopping means for preventing movement of the cartridge magnetic tape into the frame and movement of the drawer into said frame, respectively;

cartridge release means and drawer release means for releasing the cartridge stopping means and drawer stopping means, respectively;

a front door rotatably mounted on the front panel of the drawer and having on its rear surface the opening and closing means and the cartridge release means and drawer release means positioned such that closing and opening of the front door controls opening and closing of the access door, insertion of the cartridge into the frame and stoppage thereof, and movement of the drawer into the frame and stoppage thereof; and locking means for locking the drawer in an operative position in the frame.

In addition, the inventive drive has two links of different length which interconnect the frame and the movable plate. In response to movement of the drawer into the frame, the movable plate is urged in the direction of insertion of the cartridge, and the links cause the movable plate to move along a prescribed, curved path into engagement with the tape in the cartridge. The inventive drive also includes a moving member with a microswitch fixed thereto, the moving member being movable in response to insertion of the cartridge, and an operative member having a projection for pressing a detecting member of the microswitch to actuate the same when the drawer is moved to a prescribed position in the frame at which insertion of the cartridge and drawer is complete. When the cartridge is being removed from the frame, the projection of the operative member is released from contact with the detecting member of the microswitch.

According to the drive of the invention, the cartridge is manually inserted through the insertion slot onto the drawer. When the front door is manually rotated, the opening and closing means 16 opens the access door of the cartridge. When the access door of the cartridge is substantially fully opened, and the front door is further rotated to cause the cartridge release means to release the cartridge stopping means to thereby allow the cartridge to enter the frame. When the front door is further rotated so as to be completely closed, the drawer release means releases the drawer stopping means to allow the drawer to move into the frame. The front door is then further pushed in the insertion direction, and the drawer moves fully into the frame and is locked in position on the frame by the locking means, whereupon the insertion of the cartridge is completed. Therefore, by manually pushing the front door downward and into the drive, the access door of the cartridge can be opened, the cartridge and drawer can be inserted into the drive, and the magnetic head can be operatively positioned with respect to the cartridge all in one continuous operation.

Completion is detected by the microswitch. For withdrawing the cartridge from the frame, the locking means is released to permit various components to return to their initial positions, and the cartridge is forced out of the insertion slot 13.

Various components of the drive are also disposed on the drawer and a movable head plate as described herein.

BRIEF DESCRIPTION OF THE DRAWINGS

A more in-depth understanding of the invention can be had with reference to the detailed description below and to the drawings, in which:

FIG. 5 is a sectional side elevational view of the drive including a portion c but excluding certain other parts for purposes of illustration;

FIGS. 6(a) and 6(b) are enlarged views of the portion c of the drive as shown in FIG. 5;

FIGS. 9 and 10 are views showing operation of the entire drive in conjunction with FIG. 3.

DETAILED DESCRIPTION OF THE PREFERRED EMBODIMENTS

Figure 1:
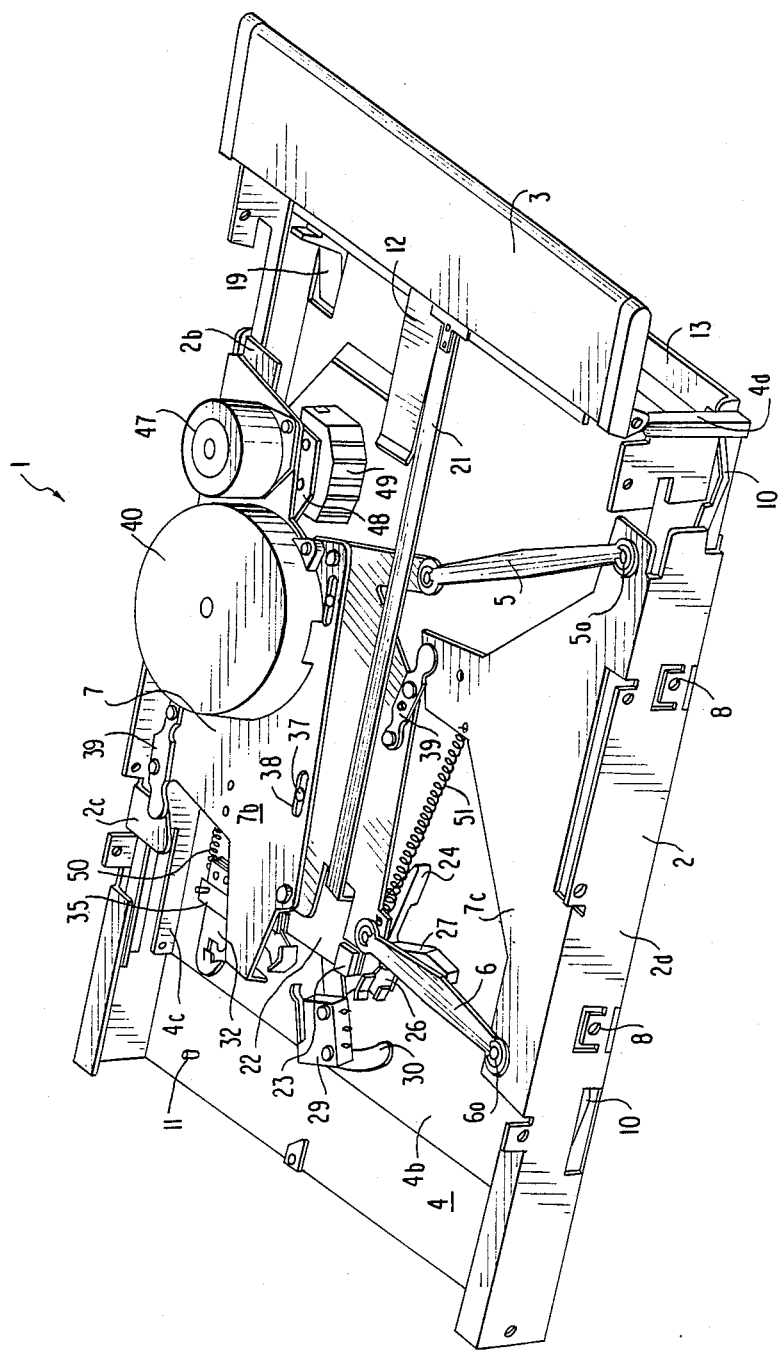
FIG. 1 is a cut-away perspective view of an embodiment of a drive according to the present invention.
Figure 2:
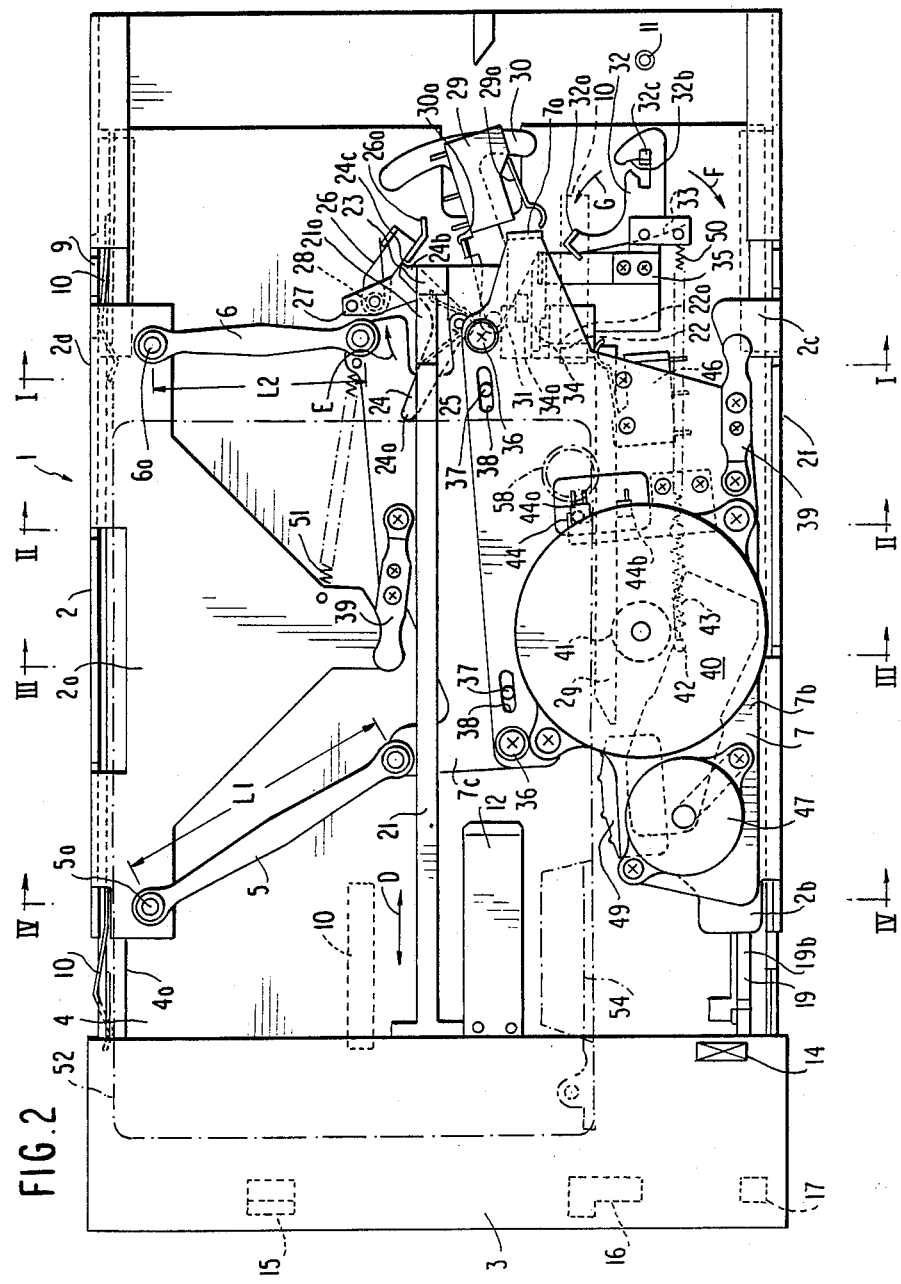
FIG. 2 is a plan view of the drive of FIG. 1.
Figure 3A:
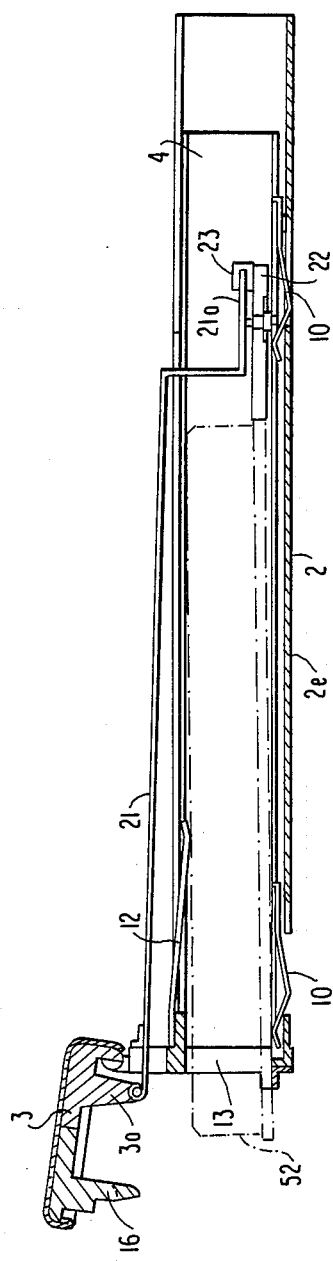
FIGS. 3(a) and 3(b) are cross-sectional side views showing conditions before and after a cartridge is inserted into the drive.
Figure 3B:
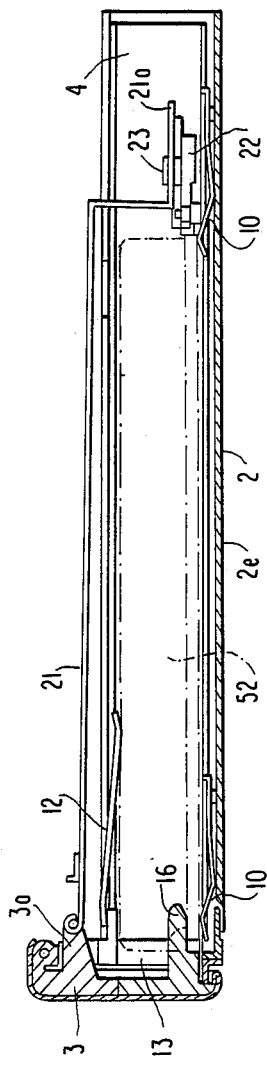
Figure 11:
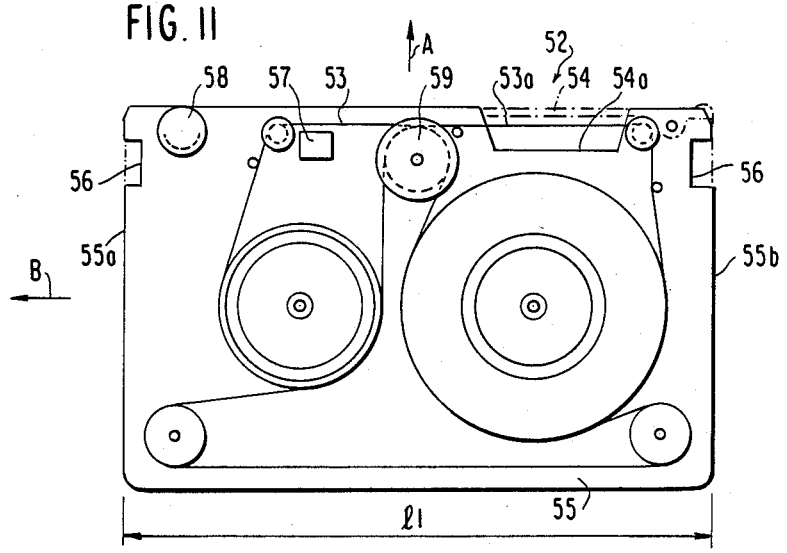
FIG. 11 is a view showing a tape cartridge for use with the inventive drive.

In FIGS. 1 and 2, a drive 1 for use with a magnetic tape cartridge or the like, is shown. The drive, for example, can be a 5-¼" form factor tape drive, which is a rectangular prism of no larger than 3-¼" by 5-¾" by 8". A magnetic cartridge 52 of a type suitable for use with the inventive drive is shown in FIG. 11. A magnetic tape 53 having a recording/reproducing surface 53a is disposed in the cartridge 52, with part of the tape in contact with a belt capstan 59 for driving the tape. The cartridge 52 has a housing 55 with a leading or rear end 55a facing in the insertion direction (B) and a trailing or front end 55b opposite the rear end 55a. Proximate to the front end 55b and on one side of the housing 55, a pivotable access door 54 is provided for covering an opening 54a in the housing through which a portion of the tape surface 53a is exposed. By pressing a tab end of the access door 54 on one side of its pivot axis, the access door rotates open. A longitudinal cut-out 56 parallel to the insertion direction is provided in the bottom portion of the housing 55 for facing a lower panel 2e of the frame 2 when the cartridge 52 is disposed in the drive (FIGS. 3a and 3b).

The cartridge 52 is inserted onto a drawer 4, and the drawer and cartridge are inserted into a frame 2 of the drive 1. The frame 2 is constructed in the form of an elongate plate having a U-shaped cross-section. The elongate plate or frame 2 has an open front end at the end of the drive through which the cartridge and drawer are inserted, and an open rear end at the opposite end of the drive. An example of such a cartridge is the one manufactured by Minnesota Mining & Manufacturing Co. which has a length of 6", a width of 4", and a pivotably mounted access door along one of the 6" sides. When the axis door is opened, the total width of the cartridge is approximately 5-¾".

The frame 2 has an integrally attached flange 2a on a first side panel 2d and small integral projections 2b, 2c on the opposite or second side panel 2f. The side panels 2d, 2f of the frame 2 have threaded holes 8 for detachably attaching the drive to another device. A drawer 4 having a vertically extending front panel 4d at its front end is movably disposed in the frame 2. The drawer is slidably movable between an extended position in which the drawer extends out of the front end of the frame for receiving the tape cartridge, and a retracted position in which the tray is within the frame and the tape cartridge is operatively positioned in the drive, as described below.

The side panels 2d, 2f and the lower panel 2e of the frame 2 have grooves 9 into which leaf springs 10 project. The leaf springs are secured effectively to first and second side panels 4a, 4c and a lower panel 4b of the drawer 4. As illustrated in FIGS. 3(a) and 3(b), when the drawer 4 is retracted, the leaf springs 10 move until they are sandwiched between the frame 2 and the drawer to thereby secure the drawer with respect to the frame. A locking pin 11 is fixedly mounted on the frame 2 (shown in FIG. 2 near the rear end and second side 2f of the frame) for engagement with a hook 32 (described later) mounted on the drawer 4.

Figure 8A:
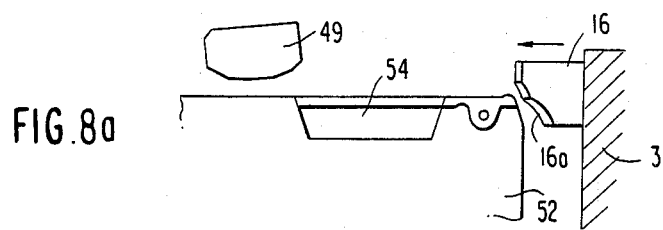
FIGS. 8(a) through 8(c) are views showing opening and closing operations of an access door of a tape cartridge for use with the inventive drive.
Figure 8B:
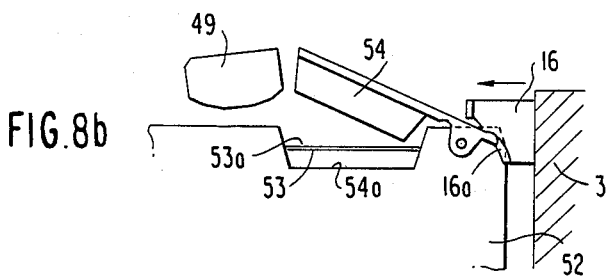
Figure 8C:
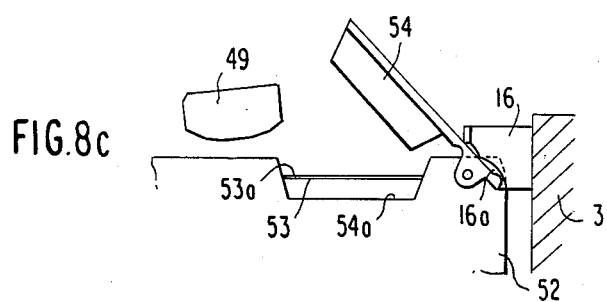

The drawer 4 is in the form of an elongate plate of U-shaped cross-section with open upper and rear ends. The drawer 4 has the front panel 4d in which an insertion slot 13 is defined for inserting and withdrawing the cartridge 52 therethrough. A leaf spring 12 is attached to the front panel and disposed over a portion of the drawer 4 near the front end and substantially centered thereon for downwardly pressing an upper surface of the cartridge 52. A front door 3 is pivotably supported between the first and second side panels 4a, 4c and an upper portion of the front panel 4d for movement through a prescribed angle. For example, the front door 3 can be rotatably mounted by means of a hinge, with its axis of rotation extending horizontally and parallel to the front end of the drawer. The front door 3 is normally urged by means of a spring 14 to an open position in which the front door is, for example, substantially parallel or past parallel to the bottom side 4b of the drawer, so that the cartridge 52 can be inserted through the slot 13. The front door 3 serves to prevent dust or the like from entering the drive and damaging a magnetic head 49 of the drive and the tape 53 of the cartridge 52. The door has a pressing means 15 mounted on its rear surface so as to confront a portion of the insertion slot 13. An access door opening/closing means includes a fixed cam 16 which is also integrally mounted on the rear surface of the front door 3 so as to confront an edge of the insertion slot 13 closer to the second side 2f of the frame then the first side 2d. When the front door 3 is rotated toward a closed position in which the door is substantially vertical and covers the insertion slot 13, the presser means 15 pushes the cartridge 52 into the frame 2. In addition, a curved contact surface 16a of the cam 16 engages an end of the access door 54 of the cartridge 52 to pivot the access door open, as shown in FIGS. 8(a) through 8(c). The presser means 15 may be dispensed with, and the cartridge 52 may be pushed into the frame 2 and the access door 54 may be opened merely by the cam 16.

A drawer release means includes a release member 17 provided on the front door 3, at an edge of the rear surface of the front door 3 adjacent or proximate to the second side 2f of the frame 2. The drawer 4 has a hole 18 defined in the front panel 4d in a position corresponding to the position of the release member 17, and a portion 19a of a drawer lock member 19 serves as a drawer stopping means and a front door locking means for releasably engaging the member 17 via the hole 18 to prevent the drawer from being inserted prior to opening of the access door and to hold the front door closed. As shown in FIGS. 5 and 7(a) through 7(c), the lock member 19 is normally urged by a spring 20 to project behind the drawer 4. Prior to insertion of the cartridge 52 through the insertion slot 13, an end of a leg 19b at the rear of the lock member 19 is positioned to abut an end face of the frame 2, thereby preventing the drawer 4 from moving into the frame 2 (FIG. 7(a)). When the cartridge 52 is inserted through the insertion slot 13 onto the drawer 4 and the front door 3 is manually rotated to the closed position, the release member 17 pushes the portion 19a of the lock member 19 to retract the leg 19b thereof above the bottom panel 2e of the frame 2, making it possible for the drawer 4 to retract into the frame 2 (FIG. 7(b)).

Upon rotation of the lock member 19, the front door 3 is closed with the leg 19b positioned above the frame 2 and a portion 17a of the release member 17 detachably fits in a groove 19c of the lock member 19 (FIG. 7 (c)) to keep the front door closed.

A cartridge release means includes a linking rod 21 which is pivotably supported on a projection 3a on the rear surface of the front door 3, the linking rod being movable in the longitudinal direction of the drawer 4 (in the direction of the arrow D in FIG. 2) as the front door is being rotated.

A block member 22 is fixedly positioned on the drawer 4 proximate the rear end thereof. The block member 22 has an integral guide 23 which vertically grips an end 21a of the linking rod 21 for holding the rod while allowing movement thereof in the longitudinal direction D. A cartridge stopping means to hold the cartridge from being fully inserted onto the tray until the access door 54 of the cartridge 52 has been opened includes a V-shaped ejector 24. The ejector 24 has its center pivotally supported on the block member 22. The ejector 24 is angularly moveable in the direction of the arrow E in FIG. 2, and is normally urged by a spring 25 to move and bias one end 24a thereof into a position to prevent the cartridge 52 from being fully inserted onto the drawer. The other end 24b of the ejector 24 has a recess 24c in which there engages one side 26a of a stopper 26 which cooperates with the ejector 24 in constituting the cartridge stopping means. The stopper 26 is angularly moveably supported on a support member 27 fixed proximate to the drawer 4, and is normally urged by a spring 28 to move and bias the side 26a into engagement with the recess 24c. When the end 21a of the linking rod 21 pushes the side 26a of the stopper 26, the stopper 26 is released from engagement with the ejector 24, allowing the pressing means 15 on the front door 3 to fully insert the cartridge into the drawer 4.

Detector means, including a microswitch 29, is fixed to a moving member 30, for detecting when the cartridge is fully inserted into the drawer 4 and the drawer is in the operative position. The moving member 30 is angularly movably disposed on the block member 22 and normally urged by a spring 31 towards the ejector 24. When the cartridge 52 is inserted into the frame 2 by the pressing means 15 as the front door 3 is closed, the leading end 55a of the cartridge 52 pushes the end 24a of the ejector 24 to rotate the latter in the direction of the arrow E, and the other end 24b of the ejector 24 pushes a projection 30a integral with the moving member 30, for thereby turning the moving member 30 in the direction of the arrow E.

Drawer locking means are provided for locking the drawer 4 in the operative or retracted position in the frame 2. The drawer locking means includes an operative member or hook 32 which is mounted on the block member 22 for angular movement in the direction of the arrow F and the vertically extending locking pin 11 mounted on the base plate 2e of the drawer, as shown in FIG. 2. The hook 32 is substantially L-shaped and has a projection 32a on one end thereof, a catching portion 32b cut out in the other end, and a slanted portion 32c to the rear of the catching portion 32b. The hook 32 is normally urged by a spring 33 to move in the direction of the arrow G, such that when the cartridge 52 and frame 2 are inserted, the catching portion 32b will engage the locking pin 11. With the cartridge and drawer in the operative position a further push of the frame 2 in the insertion direction will release the catching portion 32b from the locking pin 11 due to camming action by the slanted portion 32c.

The movable head plate 7 is supported between the first and second side panels 2d, 2f, respectively, of the frame 2 with one end connected to the flange member 2a through two links 5,6 and the other end placed on the small projections 2b, 2c. The magnetic head 49 is disposed on the head plate 7. Means for moving the head plate 7 so as to move the magnetic head 49 into operative engagement with the exposed portion of the tape surface 53a includes a roller member 34 disposed substantially centrally on the block member 22, as best shown in FIGS. 5, 6a and 6b. The roller member 34 is of a substantially L-shape and has a roller 34a mounted on its upper portion. The center of the roller member 34 is pivotably supported on the block member 22 for rotation about a horizontal axis perpendicular to the insertion direction. One end of the roller member 34 is normally urged downwardly by a leaf spring 35 fixed to the block member 22. As the drawer 4 is retracted, the roller 34a abuts against a downwardly extending bent portion 7a integral with the distal end of the head plate 7 and moves the latter in the insertion direction.

The block member 22 has a protrusion 22a which is received in a cavity 56 defined in a base 55 (FIG. 11) of the cartridge 52. Therefore, when the cartridge 52 is inserted into the insertion slot 13, with the base 55 up or with the front end 55b first, the cartridge 52 is prevented from entering the frame 2 since a respective one of the rear end 55a and the front end 55b of the base 55 is engaged by the protrusion 22a.

The movable head plate 7 is composed of a main base plate 7b and a subbase plate 7c, which are coupled to each other by a screw or screws 36 in partly overlapping relation. An attachment pin or pins 37 are disposed on the subbase plate 7c where the plates 7b, 7c are coupled, the pins 37 engaging the main base plate 7b in an attachment groove or grooves 38 defined in the main base plate. Therefore, the main base plate 7b can be adjusted in position by removing the screws 36 and moving the attachment grooves 38 along the periphery of the attachment pins 37.

One side of the subbase plate 7c is connected to the flange member 2a of the frame 2 by the two links 5, 6. The moveable plate 7 is thus supported by the frame 2 at the following three points. A portion of one end of the main base plate 7b is placed on the front small projection 2b of the frame 2. An azimuth adjuster of an adjuster mechanism 39 is used to fix the main base plate 7b to the rear small projection 2c. A tilt adjuster of the adjuster mechanism 39 is used to fix the subbase plate 7c to the flange member 2a. A spring 43 is attached between the bottom or rear of the main base plate 7b and a pin 42 is erected on the frame 2 for biasing the movable plate 7 stably against the three points.

A capstan driver motor 40 is secured to the main base plate 7b at a substantially central point thereof. A capstan 41 for transporting the tape 53 in the cartridge 52 relative to the magnetic head 49 is mounted on one end of a central shaft of the capstan driver motor 40, as shown in FIG. 4(c). A leaf spring 35 resiliently pushes the bent portion 7a of the main base plate 7b through the roller 34a to hold a peripheral surface of the capstan 41 in contact with the belt capstan 59 of the cartridge 52.

Figure 4A:
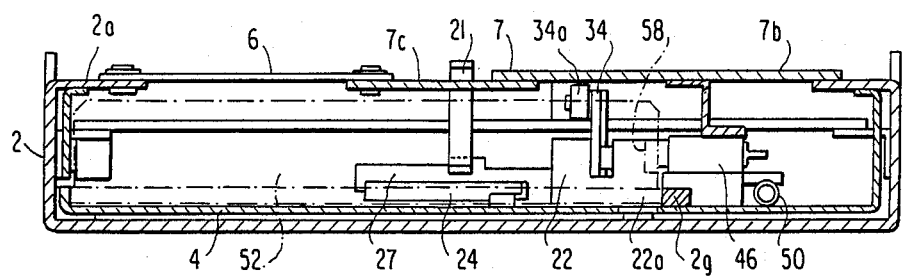
FIGS. 4(a) through 4(d) are cross-sectional views taken along lines I—I, II—II, III—III, and IV—IV, respectively, of FIG. 2, with various components of the drive being omitted for purposes of illustration.
Figure 4B:
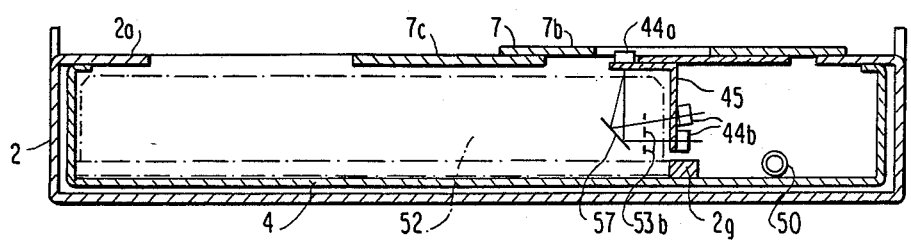
Figure 4C:
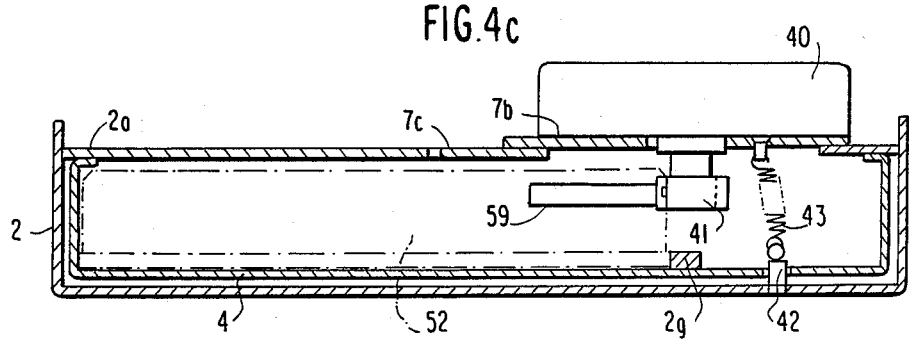
Figure 4D:
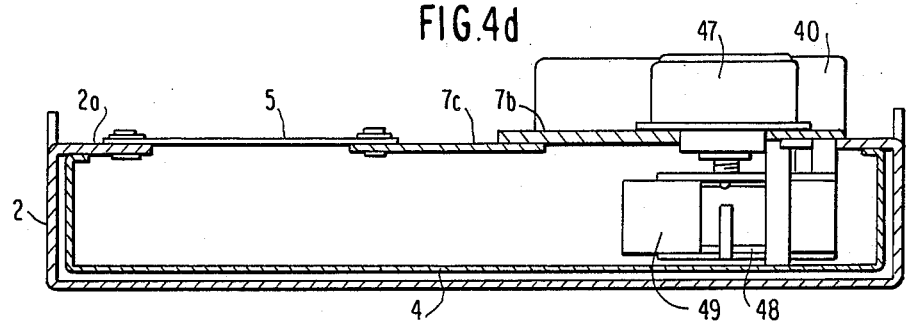
Figure 7A:
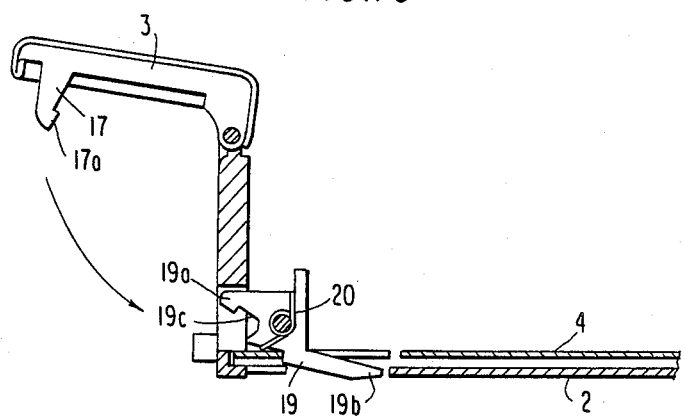
FIGS. 7(a) through 7(c) are views illustrating opening and closing operations of a front door of the inventive drive.
Figure 7B:
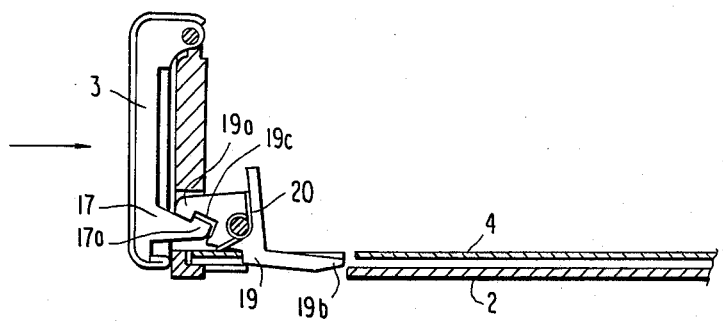
Figure 7C:
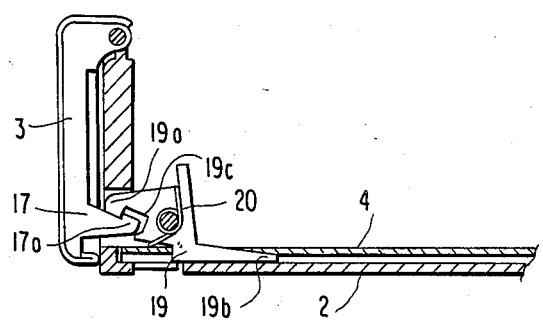

With reference to FIGS. 4a and 4b, an L-shaped support plate 45 with a tape hole sensor 44 attached thereto is secured to the bottom surface of the main base plate 7b. The tape hole sensor 44 comprises a single light-emitting element 44a and two light-detecting elements 44b for detecting a hole 53b defined in the tape 53 at a prescribed position. More specifically, light emitted by the light-emitting element 44a is applied to a tape surface 53a through a mirror 57 in the cartridge 52, and the hole 53b is detected by a variation in the light beam directed at the light-detecting elements 44b. A microswitch 46 is fixed to the main base 7b for detecting a write protector 58 disposed in the cartridge 52 for inhibiting or allowing recording on the tape 53. A head moving motor 47 is fixed to the main base plate 7b for moving the magnetic head 49 axially vertically parallel to the capstan driver motor 40. As shown in FIG. 4(d), a support frame 48 is attached to an end of the central shaft of the head moving motor 47, the head 49 being secured to one end of the support frame 48 for reproducing information from and recording information on the tape 53.

The drawer 4 moves on the frame 2 until the pawl-shaped catching portion 32b of the hook 32 is engaged by the locking pin 11. At the same time, the movable plate 7 is moved along a prescribed path to the position shown in FIG. 10. The prescribed path of movement is defined by the two links 5, 6 as they are rotated about their fixed axes 5a, 6a. Since the link 6 of smaller length L2 draws a smaller arc than the link 5 of larger length L1, the movable plate 7 moves so as to cause the head 49 to move obliquely with respect to the opening 54a in the cartridge 52. When the catching portion 32b of the hook 32 is engaged by the locking pin 11, the projection 23a of the hook 32 contacts a detecting member 29a of the microswitch 29, which detects such engagement.

Operation of the drive thus constructed will be described below.

Figure 9:
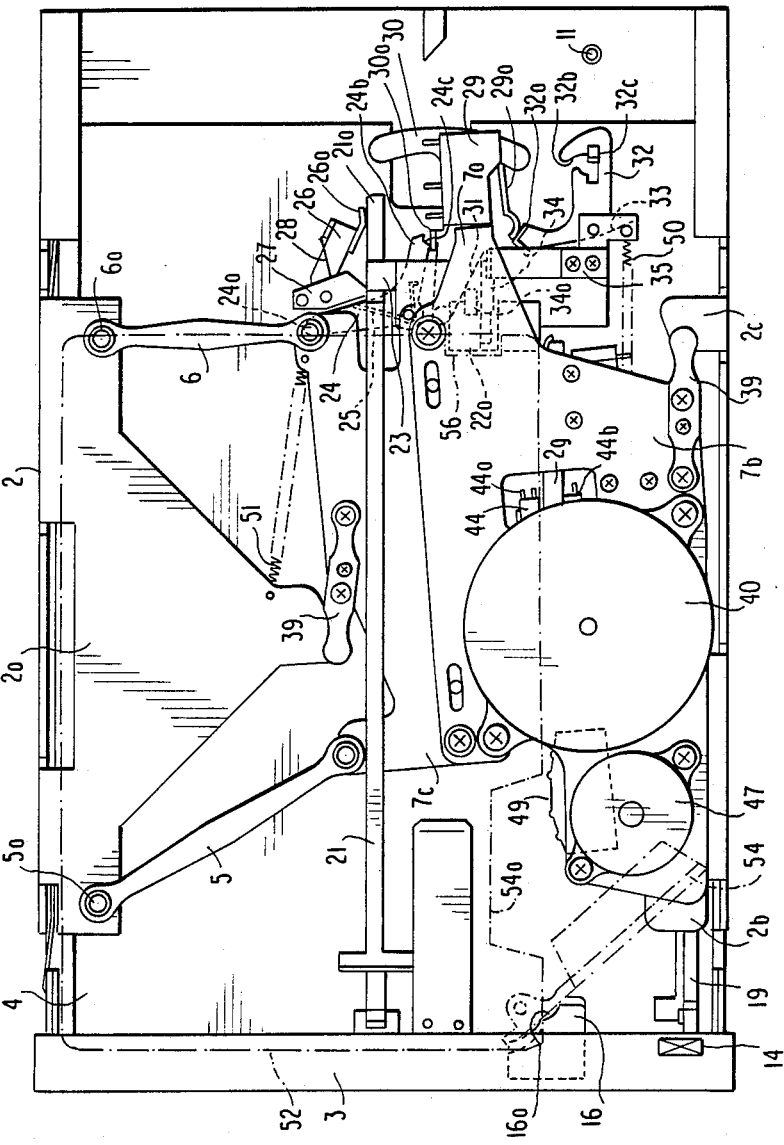

The cartridge 52 is manually inserted through the insertion slot 13 along a longitudinally extending guide 2g fixed to the frame 2 until the leading end 55a of the cartridge engages the ejector 24 and the ejector 24 engages the side 26a of the stopper 26, as shown in FIG. 2. The end face of the leg 19b of the locking member 19 is positioned so as to abut the end face of the frame 2 to prevent the drawer 4 from being inserted in the frame 2. When the front door 3 is rotated closed, the contact surface 16a of the cam 16 engages the tab end of the access door 54 and rotates the access door through a prescribed angle (FIG. 8(c)), thereby exposing a portion 53a of the tape 53. When the front door 3 is further rotated toward the closed position, the linking rod 21 disengages the ejector 24 and the stopper 26. The cartridge 52 is now movable into the frame 2. As the front door 3 is still further rotated, the presser means 15 pushes the cartridge 52 fully onto the drawer 4. When the front door 3 reaches the closed position, the release member 17 of the front door pushes the portion 19a of the locking member 19 to retract the leg 19b thereof above the bottom plate 2a of the frame 2 so that the drawer 4 is free to retract (FIG. 7(c)). Simultaneously, the insertion of the cartridge 52 rotates the ejector 24 and causes it to turn the moving member 30 (FIG. 9). Continued manual pushing of the front door 3 in the insertion direction causes the drawer 4 to retract into the frame 2. The movement of the drawer 4 causes the roller 4a to push the bent portion 7a of the movable plate 7 (FIG. 6) which travels along the prescribed path defined by the links 5, 6. The head 49 is thus moved into contact with the tape surface 53a in the opening 54a of the cartridge 52, and the capstan 41 is held against the belt capstan 59. Retraction of the drawer 4 with the cartridge 52 into the frame 2 will also cause the hook 32 of the drawer 4 to engage the locking pin 11 of frame 2 (FIG. 10). About the time that the head engages the tape, the hook 32 actuates the microswitch 29 which detects that insertion of the cartridge 52 into the frame 2 has been completed.

If the drawer 4 is retracted without the cartridge 52 positioned thereon, the ejector 24 of the moving member 30 will not be actuated. Accordingly, the detecting member 29a of the microswitch 29 will not be moved into position to be triggered by the projection 32a of the hook 32. If the cartridge 52 is positioned upside down on the tray or with the access door on the wrong side, full insertion of the cartridge into the frame is blocked by the block member 22, and the ejector 24 and the moving member 30 are only partly or halfway operated, so that the microswitch 29 is not triggered. The drawer 4 is prevented from moving inasmuch as the front door 3 cannot be completely closed.

The microswitch 29 is arranged such that it does not operate when the hook 32 does not engage the locking pin 11, i.e., when the cartridge 52 is not fully inserted into the frame 2.

To withdraw the cartridge 52 from the frame 2, the drawer 4 is pushed in the insertion direction (with the drawer and cartridge in the operative position as shown in FIG. 10) to cause the slanted portion 32c to disengage the catching portion 32b of the hook 32 from the locking pin 11. The drawer 4 is now moved toward the extended position by a spring 50 extending between the block member 22 and a pin 42 and the frame 2. At the same time that the drawer 4 reaches a prescribed position, the movable plate 7 is moved back to a prescribed position along the given path by a spring 51 extending between the subbase plate 7c and the attachment member 2a. Also at the same time, the locking member 19 rotates back to its prescribed position out of fitting engagement with the release member 17 due to the downward bias of the leg 19b, thus opening the front door (FIG. 2). As the drawer 4 extends, the ejector 24 is biased back to its position of FIG. 2 by the spring 25 and the cartridge 52 pops out of the insertion slot 13.

In the above-described drive of the present invention, the front door is disposed on the front panel of the drawer to cover the insertion slot. Therefore, dust or the like is prevented from entering the frame and depositing on the head and the exposed tape surface of the cartridge. The cross-sectional area of the insertion slot can thus be smaller than the front end of the frame, and hence the overall drive can also be smaller.

In addition, insertion of the drawer 4 moves the movable plate 7 in the insertion direction and the links 5, 6 which interconnect the frame 2 and the movable plate 7 are moved along a prescribed path about the respective fixed axes 5a, 6a upon movement of the drawer 4. The movable plate 7, on which the head is mounted, is thereby moved to a prescribed position. This simple and compact mechanism for moving the magnetic head into and out of engagement with the tape enables the size of the drive to be further reduced.

The number of parts used in the drive is minimized and the reliability of the drive is maximized by movably disposing the drawer 4, on which the cartridge 52 is placed, on the frame 2. Further, the moving member 30 to which the microswitch 29 is secured, is moved by insertion of the cartridge 52, due to the projection 32a of the operative member 32 pushing the detecting member 29a of the microswitch 29 to actuate the latter as insertion of the drawer 4 and cartridge 52 is completed. Detection of arrival of the drawer at a prescribed position in the frame and detection of insertion of a cartridge can simultaneously be achieved with high accuracy.

The long length of the drawer allows the block 22 to be disposed on the drawer and provides stability in the insertion direction. As the width of the drawer is substantially equal to the width of the frame, the drawer can be directly mounted to the frame by means of the leaf springs, with the side panels of the frame functioning as guide members.

A compact, highly reliable drive in which the cartridge can easily be inserted in one operation by means of a simple mechanism on the front door and the drawer, is thus achieved.

It should be understood that the above-described embodiments of the present invention are only preferred embodiments and are only intended to be illustrative. Various equivalent embodiments will be readily apparent to one of ordinary skill in the art. Thus, the following claims are intended not only to cover the above-described embodiments, but also embodiments which are equivalent thereto.

What is claimed is:

1. A magnetic tape drive for receiving a magnetic tape cartridge, said cartridge having an access door for covering a portion of magnetic tape, said drive comprising:
   a frame;
   a drawer mounted on said frame for movement from an extended position for receiving and supporting said cartridge to a retracted position with respect to said frame;
   means mounted on said drawer for opening said access door of said cartridge when said cartridge is supported on said drawer while said drawer is stationary and in said extended position;
   means for holding said drawer in said extended position;
   means for releasing said drawer for movement after said access door is opened;
   a magnetic head; and
   means for moving said magnetic head into an operative position with respect to said cartridge in response to movement of said drawer with said cartridge from said extended position to said retracted position.

2. A magnetic tape drive as claimed in claim 1, wherein said means for moving includes a movable plate on which said magnetic head is supported, and two links of different lengths for interconnecting said frame and said movable plate and determining the path of movement of said movable plate.

3. A magnetic tape drive as claimed in claim 1, wherein said drawer is provided for supporting said cartridge in a prescribed position, and said drive further comprises first detection means for moving from a first position to a second position in response to said cartridge being moved to said prescribed position, and a second detection means for indicating that said cartridge is in said prescribed position and said drawer is in said retracted position in response to movement of said drawer with said cartridge in said prescribed position from said extended position to said retracted position and movement of said first detection means to said second position.

4. A magnetic tape drive as claimed in claim 3, wherein said drawer has a front panel with an insertion slot defined therein, said cartridge having a length of 6" and a width of 4", and an access door being provided along one 6" side of said cartridge, said width being approximately 5-¾" when said access door is open, and said insertion slot being adapted for receiving said cartridge with said 6" side parallel to the direction in which said cartridge is inserted.

5. A magnetic tape drive as claimed in claim 1, wherein said means for opening comprises a fixed cam integrally mounted on said front door.

6. A magnetic tape drive comprising:
a frame;
a drawer having a front panel, said drawer having an insertion slot defined in said front panel for insertion therethrough of a magnetic tape cartridge, said drawer being mounted on said frame for movement from an extended position for inserting said cartridge through said slot and onto said drawer, and a retracted position at which said drawer and cartridge are contained within said frame;
a magnetic head;
means for moving said magnetic head into an operative position with respect to said cartridge;
a front door mounted on said front panel of said drawer for rotation between a first position in which said insertion slot is uncovered and a second position in which said insertion slot is covered;
means, mounted on said front door, for opening an access door of said cartridge at a first time in response to rotation of said front door from said first position to said second position;
drawer stopping means for preventing movement of said drawer into said frame;
cartridge stopping means for preventing movement of said cartridge into said drawer;
cartridge release means, mounted on said front door, for releasing said cartridge stopping means at a second time, after said first time, in response to rotation of said front door from said first position to said second position; and
drawer release means, mounted on said front door, for releasing said drawer stopping means at a third time, after said second time, in response to rotation of said front door from said first position to said second position.

7. A magnetic tape drive as claimed in claim 6, further comprising locking means for locking said drawer in said retracted position in said frame.

8. A magnetic tape drive as claimed in claim 7, wherein said drive further comprises a movable member having a microswitch fixed thereto and actuable for indicating that said cartridge is in said prescribed position and said drawer is in said retracted position, said movable member being movable in response to insertion of said cartridge to move a detecting member of said microswitch from a first position to a second position, and wherein said locking means includes a pin mounted on said frame, and an operative member, mounted on said drawer and having a projection, for engaging said pin and for moving said projection into contact with said detecting member of said microswitch to actuate the same, when said detecting member is in said second position, in response to movement of said drawer to said retracted position.

9. A magnetic tape drive as claimed in claim 6, wherein said means for opening includes means for closing said access door in response to rotation of said front door from said second position to said first position.

10. A magnetic tape drive as claimed in claim 6, wherein said means for opening comprises a fixed cam integrally mounted on said front door.

11. A magnetic tape drive as claimed in claim 6, wherein said front door has a mounting surface facing said slot when said front door is in said second position, said means for opening, said drawer release means and said cartridge release means being attached to said mounting surface.

12. A magnetic tape drive as claimed in claim 6, wherein said cartridge has a length of 6" and a width of 4", said access door being provided along one 6" side of said cartridge, said width being approximately 5-¾" when said access door is open, and said insertion slot is adapted for receiving said cartridge with said 6" side parallel to the direction in which said cartridge is inserted.

13. A magnetic tape drive as claimed in claim 12, wherein a length of said drawer is greater than the length of said cartridge, and a width of said drawer is substantially equal to that of said frame, and said cartridge stopping means is mounted on said drawer.

14. A magnetic tape drive as claimed in claim 6, wherein said means for moving said magnetic head is responsive to movement of said drawer with said cartridge from said extended position to said retracted position.

15. A magnetic tape drive for receiving a magnetic tape cartridge, said cartridge having an access door for covering a portion of magnetic tape, said drive comprising:
a drawer;
a frame for supporting said drawer for movement from an extended position for receiving said cartridge to a retracted position with respect to said frame;
means mounted on said drawer for opening said access door of said cartridge when said cartridge is supported on said drawer while said drawer is stationary and in said extended position;
means for holding said drawer in said extended position;
means for releasing said drawer after said access door is opened;
a magnetic head;
a movable plate for supporting said magnetic head; and
means for supporting said movable plate, on said frame, for movement in response to movement of said drawer from said extended position to said retracted position, from a first position to a second position in which said head is disposed in an operative position in said frame, said means for supporting including two links of different lengths for interconnecting said frame and said movable plate for determining a path of movement of said movable plate from said first position to said second position.

16. A magnetic tape drive as claimed in claim 15, wherein said magnetic head is disposed clear of said cartridge when said cartridge is on said drawer and said movable plate is in said first position.

17. A magnetic tape drive as claimed in claim 15, wherein each of said two links is movable along a prescribed path around a fixed axis.

18. A magnetic tape drive as claimed in claim 15, wherein said drawer is provided for supporting said cartridge in a prescribed position, and said drive further comprises first detection means for moving from a first position to a second position in response to said cartridge being placed in said prescribed position, and a second detection means for indicating that said cartridge is in said prescribed position and said drawer is in said retracted position in response to movement of said drawer from said extended position to said retracted position when said first detection means is in said second position.

19. A magnetic tape drive as claimed in claim 15, wherein said drawer is provided for receiving said cartridge when said drawer is in said extended position.

20. A magnetic tape drive as claimed in claim 15, wherein said drawer has a front panel with an insertion slot defined therein, said cartridge having a length of 6" and a width of 4", and an access door being provided along one 6" side of said cartridge, said width being approximately 5-¾" when said access door is open, and said insertion slot being adapted for receiving said cartridge with said 6" side parallel to the direction in which said cartridge is inserted.

21. A magnetic tape drive as claimed in claim 15, wherein said means for opening comprises a fixed cam integrally mounted on said front door.

22. A magnetic tape drive comprising:
a frame having first and second side panels disposed opposite one another;
a drawer having a bottom panel and a front panel extending substantially normal to said bottom panel, said drawer having an insertion slot, defined in said front panel, for inserting a cartridge therethrough and onto said bottom panel, said drawer being movable on said frame from an extended position for inserting said cartridge through said slot to a retracted position in which said drawer and cartridge are contained within said frame;
means for opening an access door of said cartridge to expose magnetic tape within said cartridge;
a movable plate with a magnetic head and a capstan fixed thereon;
means for supporting said movable plate between said first and second side panels of said frame; and
means for moving said movable plate, in response to movement of said drawer from said extended position to said retracted position, from a first position in which said head and capstan are disposed clear of said cartridge and said access door to a second position in which said head and capstan are operatively engaged with the magnetic tape in said cartridge, said means for moving including two links of different lengths for interconnecting said frame and said movable plate, each of said two links being movable along a prescribed path around a fixed axis, and for determining a curved path of movement of said movable plate from said first position to said second position.

23. A magnetic tape drive as claimed in claim 22, wherein said means for supporting said movable plate includes a first flange integrally attached to said first side panel of said frame, second and third flanges integrally attached to said second side panel of said frame, and means for attaching said movable plate to said first and second flanges.

24. A magnetic tape drive as claimed in claim 23, wherein said means for attaching said movable plate includes a tilt adjuster for attaching said movable plate to said first flange and an azimuth adjuster for attaching said movable plate to said second flange.

25. A magnetic tape drive as claimed in claim 22, wherein said cartridge has a length of 6" and a width of 4", said access door being provided along one 6" side of said cartridge, said width being approximately 5-¾" when said access door is open, and said insertion slot being adapted for receiving said cartridge with said 6" side parallel to the direction in which said cartridge is inserted.

26. A magnetic tape drive as claimed in claim 22, wherein said means for moving includes a roller, rotatably mounted on said drawer, for engaging an end of said movable plate and urging said plate in the direction in which said cartridge is inserted.

27. A magnetic tape drive as claimed in claim 22, wherein said means for opening comprises a fixed cam integrally mounted on said front door.

28. A magnetic tape drive for receiving a magnetic tape cartridge, said cartridge having an access door for covering a portion of magnetic tape, said drive comprising:
a frame;
a drawer supported on said frame for movement from an extended position to a retracted position relative to said frame;
means mounted on said drawer for opening said access door of said cartridge when said cartridge is supported on said drawer while said drawer is stationary and in said extended position;
means for holding said drawer in said extended position;
means for releasing said drawer after said access door is opened by said mounted means;
first detection means for moving from a first position to a second position in response to said cartridge being placed on said drawer in a prescribed position; and
second detection means for indicating that said cartridge is in said prescribed position and said drawer is in said retracted position in response to said drawer being moved from said extended position to said retracted position with said first detection means being in said second position.

29. A magnetic tape drive as claimed in claim 28, wherein said drive further comprises: a magnetic head; and means for moving said magnetic head along a path from an inoperative position to an operative position in response to movement of said drawer from said extended position to said retracted position.

30. A magnetic tape drive as claimed in claim 29, wherein said means for moving includes a movable plate on which said magnetic head is supported, and two links of different lengths for interconnecting said frame and said movable plate and determining the path of movement of said movable plate.

31. A magnetic tape drive as claimed in claim 29, wherein said first detection means comprises a movable member having a microswitch fixed thereto, actuable when said first detection means is in said second position, for indicating that said drawer is in said retracted position with said cartridge in said prescribed position.

32. A magnetic tape drive as claimed in claim 28, wherein said drawer has a front panel with an insertion slot defined therein, said cartridge having a length of 6" and a width of 4", and an access door being provided along one 6" side of said cartridge, said width being approximately 5-¾" when said access door is open, and said insertion slot being adapted for receiving said cartridge with said 6" side parallel to the direction in which said cartridge is inserted.

33. A magnetic tape drive as claimed in claim 28, wherein said means for opening comprises a fixed cam integrally mounted on said front door.

34. A magnetic tape drive for receiving magnetic tape cartridge, said drive comprsing:
 a frame;
 a drawer, having a front panel and a bottom panel for placing said cartridge thereon in a prescribed position, said front panel having an insertion slot defined therein, said drawer being movable on said frame from an extended position for inserting said cartridge through said slot to a retracted position in which said drawer and cartridge are contained within said frame;
 a movable member (30) having a microswitch (29) fixed thereto, said microswitch having a detecting member, said movable member being movable in response to insertion of said cartridge and placement thereof in said prescribed position on said drawer to move said detecting member (29a) of said microswitch from a first position to a second position; and
 an operative member (32) having a projection (32a) for contacting said detecting member of said microswitch to actuate the same, when said detecting member is in said second position, in response to movement of said drawer with said cartridge in said prescribed position to said retracted position.

35. A magnetic tape drive as claimed in claim 34, wherein said cartridge has a length of 6" and a width of 4", said access door being provided along one 6" side of said cartridge, said width being approximately 5-¾" when said access door is open, and said cartridge being inserted through said insertion slot with said 6" side parallel to the direction in which said cartridge is inserted.

36. A magnetic tape drive as claimed in claim 34, wherein said means for opening comprises a fixed cam integrally mounted on said front door.

* * * * *

UNITED STATES PATENT AND TRADEMARK OFFICE
CERTIFICATE OF CORRECTION

PATENT NO. : 4,866,552

DATED : September 12, 1989

INVENTOR(S) : Yasuo Nagase

It is certified that error appears in the above-identified patent and that said Letters Patent is hereby corrected as shown below:

On the title page, Item [73] please correct the spelling of the Assignee to read --Anritsu--.

Signed and Sealed this

Eighteenth Day of December, 1990

Attest:

HARRY F. MANBECK, JR.

*Attesting Officer*      *Commissioner of Patents and Trademarks*